United States Patent [19]

Honodel

[11] Patent Number: 4,499,828
[45] Date of Patent: Feb. 19, 1985

[54] BARRIER BREACHING DEVICE

[75] Inventor: Charles A. Honodel, Tracy, Calif.

[73] Assignee: The United States of America as represented by the United States Department of Energy, Washington, D.C.

[21] Appl. No.: 500,112

[22] Filed: Jun. 1, 1983

[51] Int. Cl.³ .............................................. F42B 3/00
[52] U.S. Cl. .................................. 102/301; 102/306; 102/319; 102/332; 102/321; 102/466; 102/476; 102/202.13
[58] Field of Search ........................ 102/301, 306–310, 102/476, 202.7, 700, 202.13, 319, 332, 321, 466

[56] References Cited

U.S. PATENT DOCUMENTS

| 3,076,408 | 2/1963 | Poulter et al. | |
|---|---|---|---|
| 3,326,125 | 6/1967 | Silvia et al. | |
| 3,658,006 | 4/1972 | Nistler et al. | |
| 3,896,731 | 7/1979 | Kümer | |
| 4,244,624 | 6/1981 | Nitzberg | 102/301 X |
| 4,248,303 | 2/1981 | Charpentier | 102/313 X |
| 4,354,433 | 10/1982 | Owen | 102/310 X |
| 4,405,104 | 9/1983 | Charman et al. | 102/202.7 X |
| 4,418,622 | 12/1983 | Foster et al. | 102/307 |

OTHER PUBLICATIONS

Schecter et al., *Wall Breaching Devices/Concepts/Technologies*, vol. II, Final Report, NSCW, TR 80-140, pp. A-7, A-8, A-9, Mar., 1980.

*Primary Examiner*—Peter A. Nelson
*Attorney, Agent, or Firm*—Clifton E. Clouse, Jr.; Roger S. Gaither

[57] ABSTRACT

A barrier breaching device that is designed primarily for opening holes in interior walls of buildings uses detonating fuse for explosive force. The fuse acts as the ribs or spokes of an umbrella-like device that may be opened up to form a cone. The cone is placed against the wall so that detonating fuse that rings the base of the device and which is ignited by the spoke-like fuses serves to cut a circular hole in the wall.

14 Claims, 6 Drawing Figures

BARRIER BREACHING DEVICE

The U.S. Government has rights in this invention pursuant to Contract No. W-7405-ENG-48 between the U.S. Department of Energy and the University of California.

BACKGROUND OF THE INVENTION

This invention relates to an explosive device for providing an opening through a barrier such as a wall or the like. In particular, it relates to an easily transportable collapsible device that, upon deployment, may be used by emergency or military personnel to cut a hole through an interior wall of a building rapidly and relatively safely with respect to the individuals operating the device.

In military operations, and frequently in emergency situations, it is often necessary to provide access through a barrier such as interior wall of a building rapidly and expeditiously with a minimum amount of damage to the building and with a minimum hazard to the individuals desiring access. While it is possible to use mechanical means such as axes, saws, hammers and the like, quite frequently such devices are cumbersome and relatively slow in their effectiveness. In military operations, to use such devices may prove to be counterproductive in that the individual on the opposite side of the barrier or wall will receive forewarning of those desiring access. This, of course, may prove disastrous to those desiring access in that the occupants of the space on the opposite side of the barrier may attack those desiring access with countermeasures up to and including explosives of their own. Thus, it is particularly desirable to provide access capability in military situations, with the least amount of warning to those on the other side of the barrier.

In the emergency case, it may be a situation that precludes the use of mechanical devices such as hammers, saws, axes, and the like. This may be especially true in the event of a fire where it is desirable to vent smoke from a given space or to provide oxygen to another space.

Previous attempts at providing explosive devices for opening holes in barriers such as walls have generally utilized shaped charges requiring relatively precise positioning and a certain degree of tamping to ensure proper utilization of the explosive. In one form, the shaped charge includes a metal backing or form to the explosive which, of course, will result in a heavy amount of shrapnel being thrown rearwardly from the charge. While charges such as these may be useful against heavy steel bulkheads or doors, they are far too powerful for interior walls made of plaster or the like.

Other methods of breaching interior walls have been suggested, including conventional block-type explosives, launched high explosives, focussed charges and other types of explosives including petards. Mechanical means, as noted above, include axes, hammers, saws, and also such things as jackhammers, torches, and the like. One problem with previous wall-breaching methods has been the hazard associated therewith. Not only is there the hazard of shrapnel, as mentioned, with the shaped charge type device, but also shock waves, overpressure, chemical poisoning, asphyxiation, and in some instances the starting of fires. It should be readily apparent that, the more explosive used, the higher the hazard. Thus, with non-load-bearing interior walls made of plaster and the like where breaching is important, it is appropriate to use a minimum amount of explosive, even to the point where operating personnel can remain nearby.

In addition to the hazards associated with existing explosives denoted above, it is important to provide a device that is easily transported by the user. Specifically, a lightweight device so that the user may carry two or three devices without being overly burdened. The device should also be easily detonated and relatively easily affixed to the barrier that is to be breached.

It is an object of this invention to overcome one or more of the disadvantages as set forth above.

In particular, it is an object of this invention to provide a lightweight easily-transportable wall breaching device.

It is a further object of this invention to provide a wall breaching device that may be utilized by emergency personnel or military troops without requiring the users to remove themselves too far from the site of the intended breach.

These and other objects of the invention will be apparent from the appended drawings and the following description.

SUMMARY OF THE INVENTION

This invention is a wall breaching device including a hub and a relatively flexible conical member affixed at its apex to the hub. A plurality of relatively rigid spokes each having explosive qualities are included, with each spoke affixed at one end to the hub and extending therefrom to the base of the cone. The relatively flexible cone member is fixed to the spokes in an umbrella-like fashion. The explosive spokes each have an extension distal of the hub so that each extension forms with the conical member a generally circular base to the cone. The conical member and the spokes are callapsible in a generally cylindrical manner for storage and transport while a fuse means is provided to detonate the explosive spokes.

DETAILED DESCRIPTION OF THE PREFERRED EMBODIMENT

Figure 2:
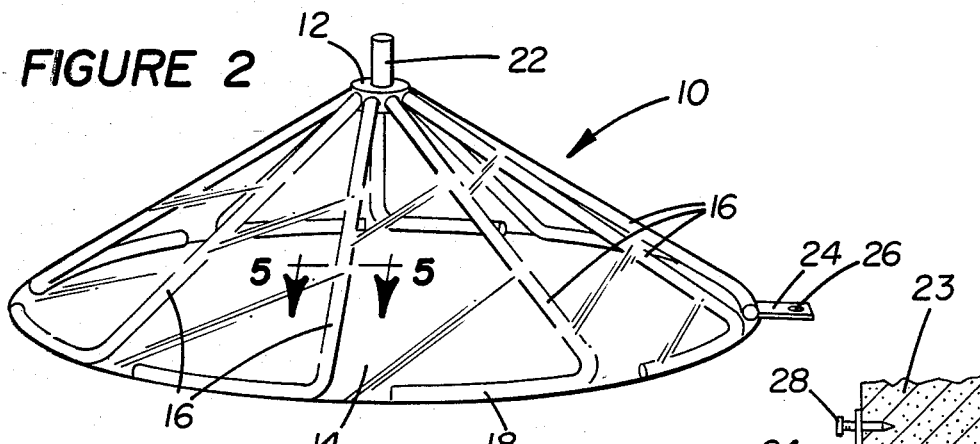
FIG. 2 shows the wall breaching device in its expanded or deployed state.

Referring now to FIG. 2, a wall breaching device 10 is shown in its deployed or expanded state. Device 10 includes a hub 12 and a relatively flexible conical member 14 affixed at its apex to hub 12. Conical member 14 may be made of a suitable plastic such as Mylar or the like. It is important that the conical member 14 be made of a material that, in the presence of an explosive force, will not become shrapnel-like, thereby injuring individuals in the immediate vicinity.

Included in device 10 is a plurality of explosive spokes or ribs 16 that are relatively rigid and provide a degree of structural integrity to the cone 10 when it is in its extended state as shown in FIG. 2. The rigidity of the spoke may be integral therewith or come from stiffeners as described below.

Each spoke 16 is fixed at one end to hub 12 and has at its other end an explosive extension 18. The plurality of extensions 18, as can be seen in FIG. 2, form a circular base to the cone 10. Each extension 18 is relatively flexible when compared to spokes 16. Finally, a tab 24 is fixed to the perimeter of the cone for use in fixing the device to a wall or the like.

Figures 5, 6:
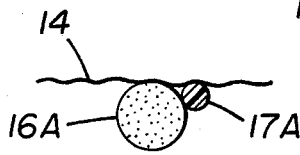
FIG. 5 is a cross section of the spoke taken at 5—5 of FIG. 2.
FIG. 6 is an alternative arrangement of the spoke support shown in FIG. 5.

The structure of spokes 16 and extensions 18 is similar, except that each spoke 16 includes a stiffener 17 which preferably is made of a plastic that would burn rather than shatter in the presence of an explosive contained in the tube. Alternatively, a stiffener 17A may be positioned adjacent the spoke 16A as indicated in FIG. 6. Specifically, the spokes 16 and extensions 18 may be a nylon tubing filled with an explosive such as RDX, PETN, or TNT. One material that is suitable for use in this device is a detonating fuse sold under the trademark of PRIMACORD by the Ensign Bickford Corporation. This particular detonating fuse uses pentaerythritetetranitrate explosive, which has a relatively high rate of detonation, i.e., in excess of 20,000 feet per second. It is appropriate to use a detonating fuse having such a high rate of detonation in order to provide the necessary shearing force. The stiffener may be of mylar.

Figure 1:
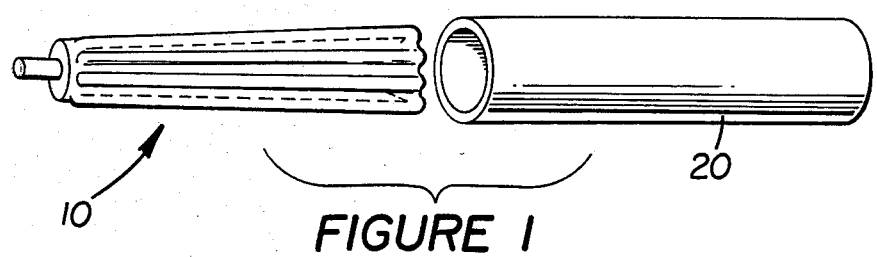
FIG. 1 shows the wall breaching device in its collapsed state and the carrying case associated therewith.
Figure 3:
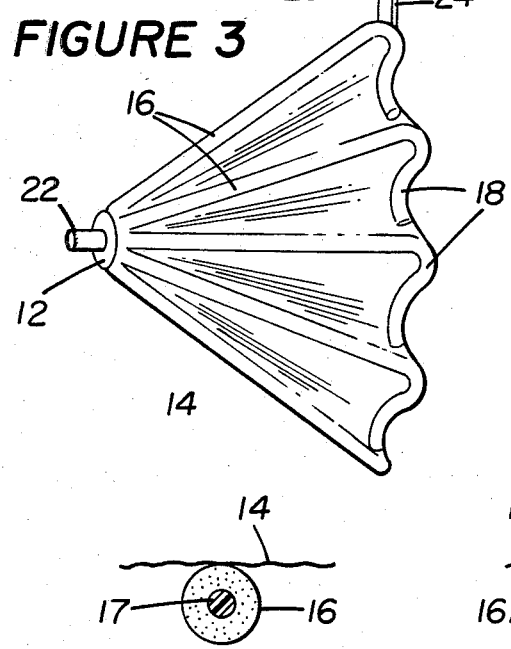
FIG. 3 shows the same wall breaching device in a semi-expanded state.

The conical member 14 is affixed to rigid spokes 16 and stiffeners 17 in such a manner that it can be collapsed in an umbrella-like manner to form a generally cylindrical shape as shown in FIG. 3 and finally as illustrated in FIG. 1. In the collapsed state as shown in FIG. 1, the entire device may be stored in a tube 20 made of fiberboard or the like. It should be clear that the stiffeners 17 do not extend into extensions 18.

Finally, associated with the device is a fuse 22 which is shown here in a squib-like form. This fuse can be any fuse well known in the art, but preferably has a delay device similar to that found in a hand grenade. Thus, the device may be fixed for use and the fuse released so that the user may evacuate the immediate space prior to detonation.

INDUSTRIAL USAGE

Figure 4:
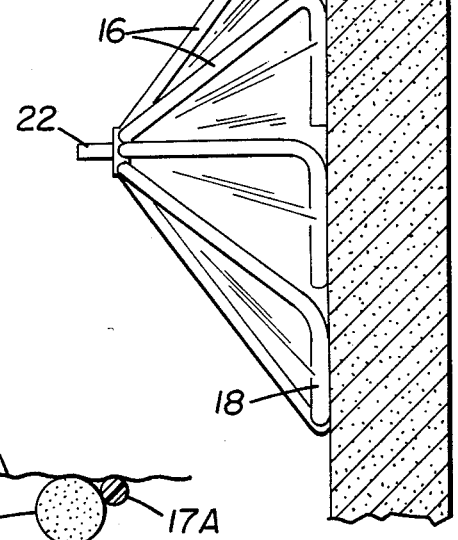
FIG. 4 shows the wall breaching device affixed to an exemplary wall.

Referring now to FIG. 4, it can be seen how the device is used in relation to a barrier or wall 23. Specifically, tab 24 is affixed at one point to the conical member 14 in the manner shown in FIGS. 2 and 3. This tab may have a hole 26 so that the device can be nailed to the wall by a nail 28. Alternatively, the device can be taped to the wall using any appropriate tape. Once the device is affixed to the wall, the fuse 22 may be activated. The user then would evacuate the room waiting for the device to detonate. The structure of the device is such that detonation moves down the spokes 16, thence along the extensions 18. This sequence of detonation results in an air lens type concept. The air mass thus formed acts as a follow-through impulse to the cutting action resulting from the detonations of extensions 18 so that the plug thus formed is propelled through the aperture formed in the wall 23. The structure of the device is such that there are no metallic forms such as found in conventional shaped charges that would result in shrapnel. The device is of a minimum weight. In fact, the high explosive in the device should preferably weigh less than 8/10 pound (0.36 Kg). The desired deployed size should be approximately two feet (0.6 m) so that the cone 10 as shown in FIG. 2 in its deployed state should have a diameter or base of approximately two feet.

This device is particularly useful against lath and plaster type interior walls, exterior wood-frame walls, drywall partition, and the like. It is not likely that the device would be usable against concrete or reinforced concrete walls. It is equally usable against floors and ceilings in the manner described above.

While an embodiment of the invention has been shown and described, further embodiments or combinations will be apparent to those skilled in the art without departing from the spirit of the invention.

I claim:

1. A barrier breaching device comprising:
   a hub;
   a relatively flexible conical member affixed at its apex to said hub;
   a plurality of relatively rigid spokes having explosive qualities, each spoke affixed at one end to said hub and extending therefrom to the base of said cone, said relatively flexible cone member affixed to said spokes in an umbrella-like fashion;
   said explosive spokes having an explosive extension distal of said hub end, said extensions forming with said conical member a generally circular base;
   said conical member and said spokes collapsible in a generally cylindrical manner for storage and transport; and
   fuse means for detonating said explosive spokes and extensions.

2. The barrier breaching device of claim 1 wherein said explosive spokes are made of relatively rigid nylon tubing filled with an explosive having a rate of detonation greater than 15,000 feet per second, said spokes sufficiently rigid to support the flexible conical member in a cone shape.

3. The barrier breaching device of claim 2 wherein the spoked extensions are relatively less rigid than the spoked portion and formed of a nylon tube filled with the same explosive as said tube.

4. The barrier breaching device of claim 1 further including a tube for carrying said device.

5. The barrier breaching device of claim 1 further including means for fixing said device to a vertical wall.

6. The barrier breaching device of claim 1 wherein said fuse means includes a time delay.

7. The barrier breaching device of claim 1 wherein the diameter of the base of the conical member when extended is at least 24 inches.

8. The barrier breaching device of claim 3 wherein the total weight of the explosive is less than 8/10 pound.

9. The barrier breaching device of claim 8 wherein the diameter of the base of the conical member, when extended, is less than 24 inches.

10. The barrier breaching device of claim 9 further including means for fixing said device to a vertical wall.

11. The barrier breaching device of claim 9 further including the tube for carrying said device.

12. The barrier breaching device of claim 2 further including stiffeners associated with each spoke.

13. The barrier breaching device of claim 12 wherein each stiffener is located inside the nylon tubing.

14. The barrier breaching device of claim 12 wherein each stiffener is located adjacent each spoke.

* * * * *